(12) United States Patent
Raghavan et al.

(10) Patent No.: US 11,968,008 B2
(45) Date of Patent: Apr. 23, 2024

(54) EXCHANGING ANTENNA ARRAY PROPERTIES TO ASSIST BEAMFORMING ON A WIRELESS LINK

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 17/190,223

(22) Filed: Mar. 2, 2021

(65) Prior Publication Data
US 2022/0286168 A1 Sep. 8, 2022

(51) Int. Cl.
*H04B 7/06* (2006.01)
*H04W 72/0453* (2023.01)

(52) U.S. Cl.
CPC ...... *H04B 7/0617* (2013.01); *H04W 72/0453* (2013.01)

(58) Field of Classification Search
CPC .. H04B 7/0617; H04B 7/0628; H04B 7/0691; H04W 72/0453
See application file for complete search history.

(56) References Cited

U.S. PATENT DOCUMENTS

| 2018/0152227 A1* | 5/2018 | Frank | H04B 7/0456 |
| 2018/0152228 A1* | 5/2018 | Frank | H04B 7/0456 |
| 2018/0152325 A1* | 5/2018 | Frank | H04B 7/0413 |

OTHER PUBLICATIONS

Nayana Chaskar; Effect of Dimension, Spacing, Periodicity and Shape of RIS on Resonant Frequency and Bandwidth of 2 × 2 Antenna Array; 2016 (Year: 2016).*

* cited by examiner

*Primary Examiner* — Ricky Q Ngo
*Assistant Examiner* — Stephen N Steiner
(74) *Attorney, Agent, or Firm* — QUALCOMM Incorporated

(57) ABSTRACT

Various aspects of the present disclosure generally relate to wireless communication. In some aspects, a wireless node may transmit, to another wireless node, information related to one or more properties of a first antenna array associated with the wireless node. The wireless node may receive, from the other wireless node, information related to one or more properties of a second antenna array associated with the other wireless node. The wireless node may communicate with the other wireless node over a wireless link using one or more beams associated with an operating frequency, wherein the operating frequency is based at least in part on the one or more properties of the first antenna array and the one or more properties of the second antenna array. Numerous other aspects are described.

30 Claims, 10 Drawing Sheets

US 11,968,008 B2

EXCHANGING ANTENNA ARRAY PROPERTIES TO ASSIST BEAMFORMING ON A WIRELESS LINK

FIELD OF THE DISCLOSURE

Aspects of the present disclosure generally relate to wireless communication and to techniques and apparatuses associated with exchanging antenna array properties to assist beamforming on a wireless link.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
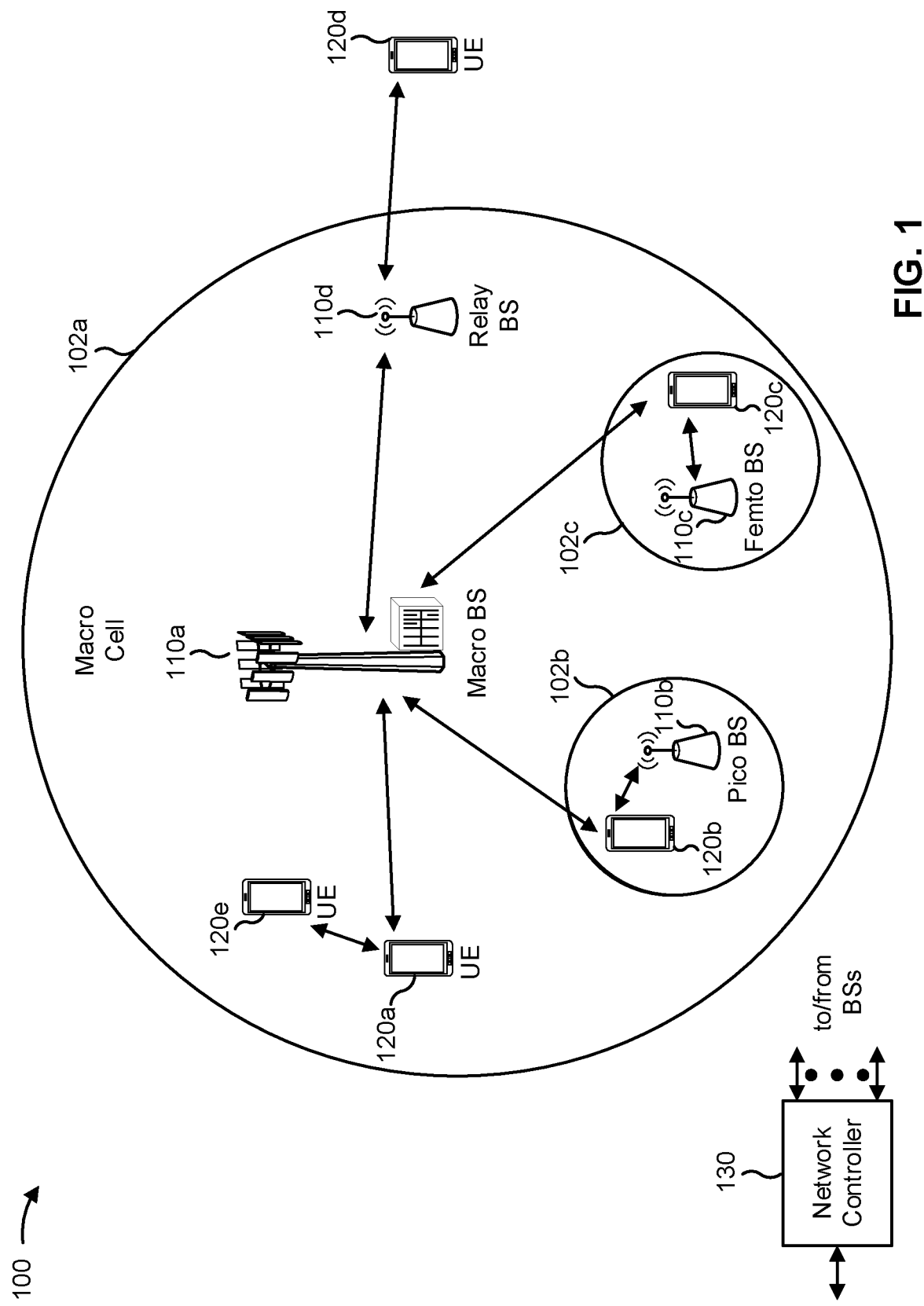
FIG. 1 is a diagram illustrating an example of a wireless network, in accordance with the present disclosure.

In some aspects, a method of wireless communication performed by a wireless node includes transmitting, to another wireless node, information related to one or more properties of a first antenna array associated with the wireless node; receiving, from the other wireless node, information related to one or more properties of a second antenna array associated with the other wireless node; and communicating with the other wireless node over a wireless link using one or more beams associated with an operating frequency, wherein the operating frequency is based at least in part on the one or more properties of the first antenna array and the one or more properties of the second antenna array.

In some aspects, a wireless node for wireless communication includes a memory; and one or more processors, coupled to the memory, configured to: transmit, to another wireless node, information related to one or more properties of a first antenna array associated with the wireless node; receive, from the other wireless node, information related to one or more properties of a second antenna array associated with the other wireless node; and communicate with the other wireless node over a wireless link using one or more beams associated with an operating frequency, wherein the operating frequency is based at least in part on the one or more properties of the first antenna array and the one or more properties of the second antenna array.

In some aspects, an apparatus for wireless communication includes means for transmitting, to another wireless node, information related to one or more properties of a first antenna array associated with the wireless node; means for receiving, from the other wireless node, information related to one or more properties of a second antenna array associated with the other wireless node; and means for communicating with the other wireless node over a wireless link using one or more beams associated with an operating frequency, wherein the operating frequency is based at least in part on the one or more properties of the first antenna array and the one or more properties of the second antenna array.

In some aspects, a non-transitory computer-readable medium storing a set of instructions for wireless communication includes one or more instructions that, when executed by one or more processors of a wireless node, cause the wireless node to: transmit, to another wireless node, information related to one or more properties of a first antenna array associated with the wireless node; receive, from the other wireless node, information related to one or more properties of a second antenna array associated with the other wireless node; and communicate with the other wireless node over a wireless link using one or more beams associated with an operating frequency, wherein the operating frequency is based at least in part on the one or more properties of the first antenna array and the one or more properties of the second antenna array.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or new radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength (λ) into various classes, bands, channels, or the like. For example, devices of wireless network 100 may communicate using an operating band having a first frequency range (FR1), which may span from 410 MHz to 7.125 GHz, may communicate using an operating band having a second frequency range (FR2), which may span from 24.25 GHz to 52.6 GHz, may communicate using an operating band having a third frequency range (FR3), which may span from 7.125 GHz to 24.25 GHz, may communicate using an operating band having a fourth frequency range (FR4), which may span from 52.6 GHz to 114.25 GHz, and/or may communicate using an operating band having a fifth frequency range (FR5), which may include frequencies higher than 114.25 GHz (e.g., sub-terahertz). Note that FR3 is between FR1 and FR2, and FR4 and FR5 are above FR2. The frequencies between FR1 and FR2 (e.g., in FR3) are sometimes referred to as mid-band or "sub-centimeter wave" frequencies. Although a portion of FR1 is greater than 6 GHz, FR1 is often referred to as a "sub-6 GHz" band. Similarly, FR2 and FR4 are often referred to as "millimeter wave" bands despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, FR4, and/or FR5, and/or mid-band frequencies (e.g., less than 24.25 GHz). Furthermore, it is contemplated that the frequencies included in FR1, FR2, FR3, FR4, and/or FR5 may be modified, and techniques described herein are applicable to those modified frequency ranges.

As indicated above, FIG. 1 is provided as an example. Other examples may differ from what is described with regard to FIG. 1.

Figure 2:
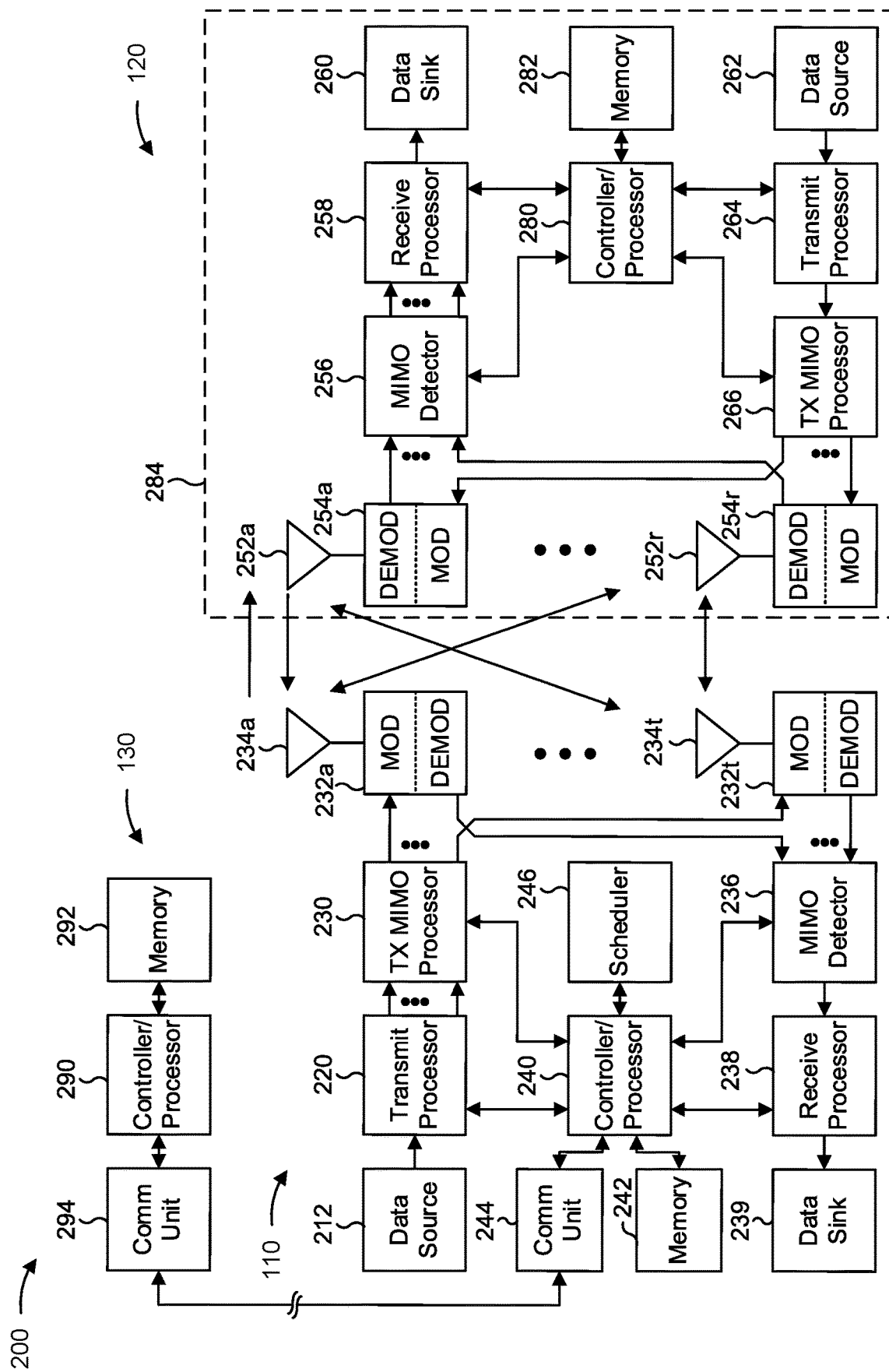
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, antenna arrays, and/or antenna modules, among other examples. An antenna panel, an antenna group, a set of antenna elements, an antenna array, and/or an antenna module may include one or more antenna elements in one or more dimensions (e.g., an azimuth dimension and/or an elevation dimension). An antenna panel, an antenna group, a set of antenna elements, an antenna array, and/or an antenna module may include a set of co-planar antenna elements and/or a set of non-co-planar antenna elements, which may have a uniform inter-antenna element spacing or a non-uniform inter-antenna element spacing. An antenna panel, an antenna group, a set of antenna elements, an antenna array, and/or an antenna module may include antenna elements within a single housing and/or antenna elements within multiple housings. An antenna panel, an antenna group, a set of antenna elements, an antenna array, and/or an antenna module may include one or more antenna elements coupled to one or more transmission and/or reception components, such as one or more components of FIG. 2, FIG. 3, and/or FIG. 4.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-7).

Controller/processor 240 of base station 110, controller/processor 280 of UE 120, and/or any other component(s) of FIG. 2 may perform one or more techniques associated with exchanging antenna array properties to assist beamforming on a wireless link, as described in more detail elsewhere herein. In some aspects, a wireless node as described herein may be the base station 110, may be included in the base station 110, or may include one or more components of the base station 110 shown in FIG. 2. Additionally, or alternatively, a wireless node as described herein may be the UE 120, may be included in the UE 120, or may include one or more components of the UE 120 shown in FIG. 2 For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, a wireless node includes means for transmitting, to another wireless node, information related to one or more properties of a first antenna array associated with the wireless node; means for receiving, from the other wireless node, information related to one or more properties of a second antenna array associated with the other wireless node; and/or means for communicating with the other wireless node over a wireless link using one or more beams associated with an operating frequency that is based at least in part on the one or more properties of the first antenna array and the one or more properties of the second antenna array. In some aspects, the means for the wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. Additionally, or alternatively, in some aspects, the means for the wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
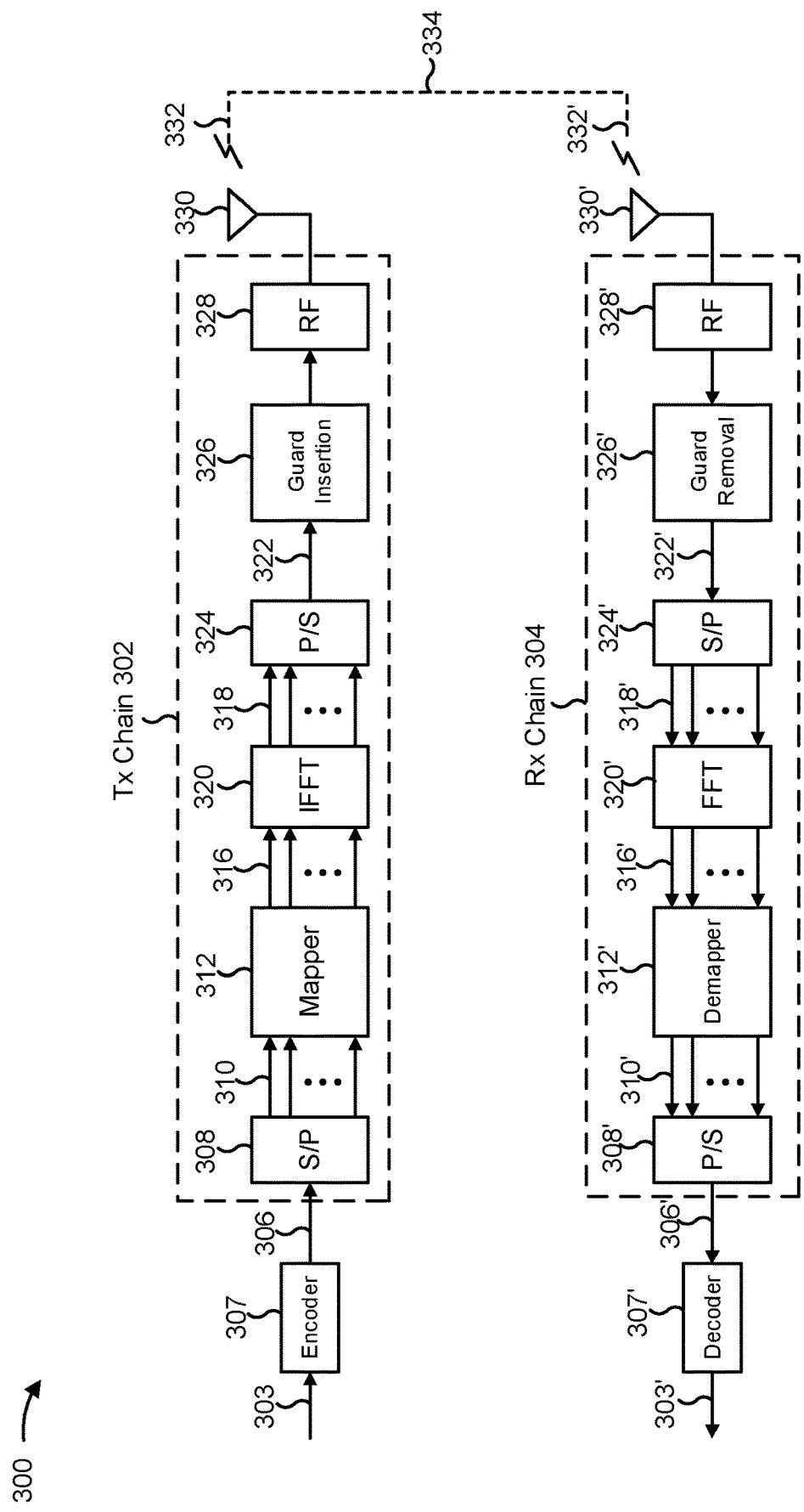
FIG. 3 is a diagram illustrating an example of a transmit chain and a receive chain of a wireless node, in accordance with the present disclosure.

FIG. 3 is a diagram illustrating an example 300 of a transmit (Tx) chain 302 and a receive (Rx) chain 304 of a wireless node (e.g., base station 110, UE 120, and/or another suitable device having wireless communication capabilities) in accordance with the present disclosure. In some aspects, one or more components of Tx chain 302 may be implemented in transmit processor 264, TX MIMO processor 266, MOD/DEMOD 254, and/or controller/processor 280, as described above in connection with FIG. 2. In some aspects, Tx chain 302 may be implemented in UE 120 for transmitting data 306 (e.g., uplink data, an uplink reference signal, and/or uplink control information) to base station 110 on an uplink channel. Additionally, or alternatively, one or more components of Tx chain 302 may be implemented in transmit processor 220, TX MIMO processor 230, MOD/DEMOD 232, and/or controller/processor 240, as described above in connection with FIG. 2. In some aspects, Tx chain 302 may be implemented in base station 110 for transmitting data 306 (e.g., downlink data, a downlink reference signal, and/or downlink control information) to UE 120 on a downlink channel.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 312 may output N parallel symbol streams 316, each symbol stream 316 corresponding to one of N orthogonal subcarriers of an inverse fast Fourier transform (IFFT) component 320. These N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, MOD/DEMOD 254, and/or controller/processor 280, as described above in connection with FIG. 2. In some aspects, Rx chain 304 may be implemented in UE 120 for receiving data 306 (e.g., downlink data, a downlink reference signal, and/or downlink control information) from base station 110 on a downlink channel. Additionally, or alternatively, one or more components of Rx chain 304 may be implemented in receive processor 238, MIMO detector 236, MOD/DEMOD 232, and/or controller/processor 240, as described above in connection with FIG. 2. In some aspects, Rx chain 304 may be implemented in base station 110 for receiving data 306 (e.g., uplink data, an uplink reference signal, and/or uplink control information) from UE 120 on an uplink channel.

A transmitted signal 332 is shown traveling over a wireless channel 334 from Tx chain 302 to Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
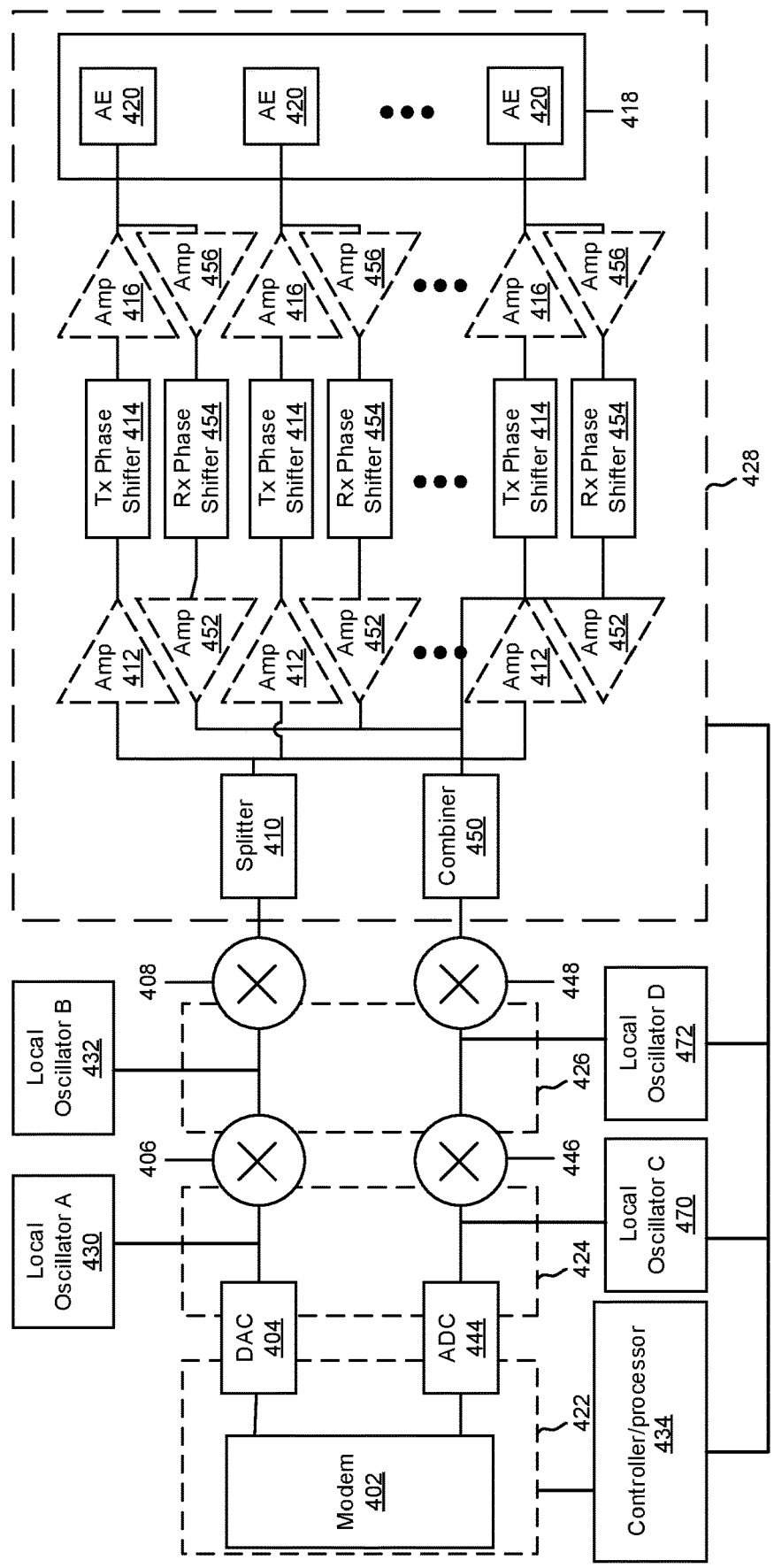
FIG. 4 is a diagram illustrating an example beamforming architecture that supports beamforming for millimeter wave communications, in accordance with the present disclosure.

FIG. 4 is a diagram illustrating an example beamforming architecture 400 that supports beamforming for millimeter wave (mmW) communications, in accordance with the present disclosure. In some aspects, architecture 400 may implement aspects of wireless network 100. In some aspects, architecture 400 may be implemented in a transmitting device (e.g., a first wireless node, such as a UE, a base station, a TRP, an integrated access and backhaul (IAB) node, or another suitable wireless communication device) and/or a receiving device (e.g., a second wireless node, such as a UE, a base station, a TRP, an IAB node, or another suitable wireless communication device), as described herein.

Broadly, FIG. 4 is a diagram illustrating example hardware components of a wireless node in accordance with certain aspects of the disclosure. The illustrated components may include those that may be used for antenna element selection, for operating frequency selection, and/or for beamforming for transmission and/or reception of wireless signals. There are numerous architectures for antenna element selection and implementing phase shifting, only one example of which is illustrated here. The architecture 400 includes a modem (modulator/demodulator) 402, a digital-to-analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog radio frequency (RF) signals travel or are processed. The architecture also includes a local oscillator A 430, a local oscillator B 432, and a controller/processor 434. In some aspects, controller/processor 434 corresponds to controller/processor 240 of the base station 110 described above in connection with FIG. 2 and/or controller/processor 280 of the UE 120 described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear (e.g., one-dimensional) pattern, a planar (e.g., two-dimensional) pattern, or another suitable pattern in one or more dimensions (e.g., a circular or elliptical design). A spacing between antenna elements 420 (d), which may be referred to herein as an inter-antenna element spacing, may be such that signals with a desired wavelength ($\lambda$) transmitted separately by the antenna elements 420 may interact or constructively interfere (e.g., to form a desired beam). For example, given an expected range of wavelengths or frequencies, the spacing may provide a quarter wavelength (0.25 $\lambda$), a half wavelength (0.5 $\lambda$), or another fraction of a wavelength (n*$\lambda$) of spacing between neighboring antenna elements 420 to allow for interaction or constructive interference of signals transmitted by the separate antenna elements 420 within that expected range. In some aspects, the spacing between the antenna elements 420 may be uniform or non-uniform in one or more dimensions (e.g., may be uniform or non-uniform in an azimuth dimension, an elevation dimension, and/or the azimuth and elevation dimensions).

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to digital signals. The digital signals output from ADC 444 is input to modem 402 for baseband processing, such as decoding, de-interleaving, or similar operations.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, antenna panels, and/or antenna modules. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single wireless node may include two, four, or more antenna arrays for transmitting or receiving signals at different physical locations on the wireless node or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

As indicated above, FIG. 4 is provided as an example. Other examples may differ from what is described with regard to FIG. 4.

Figure 5A:
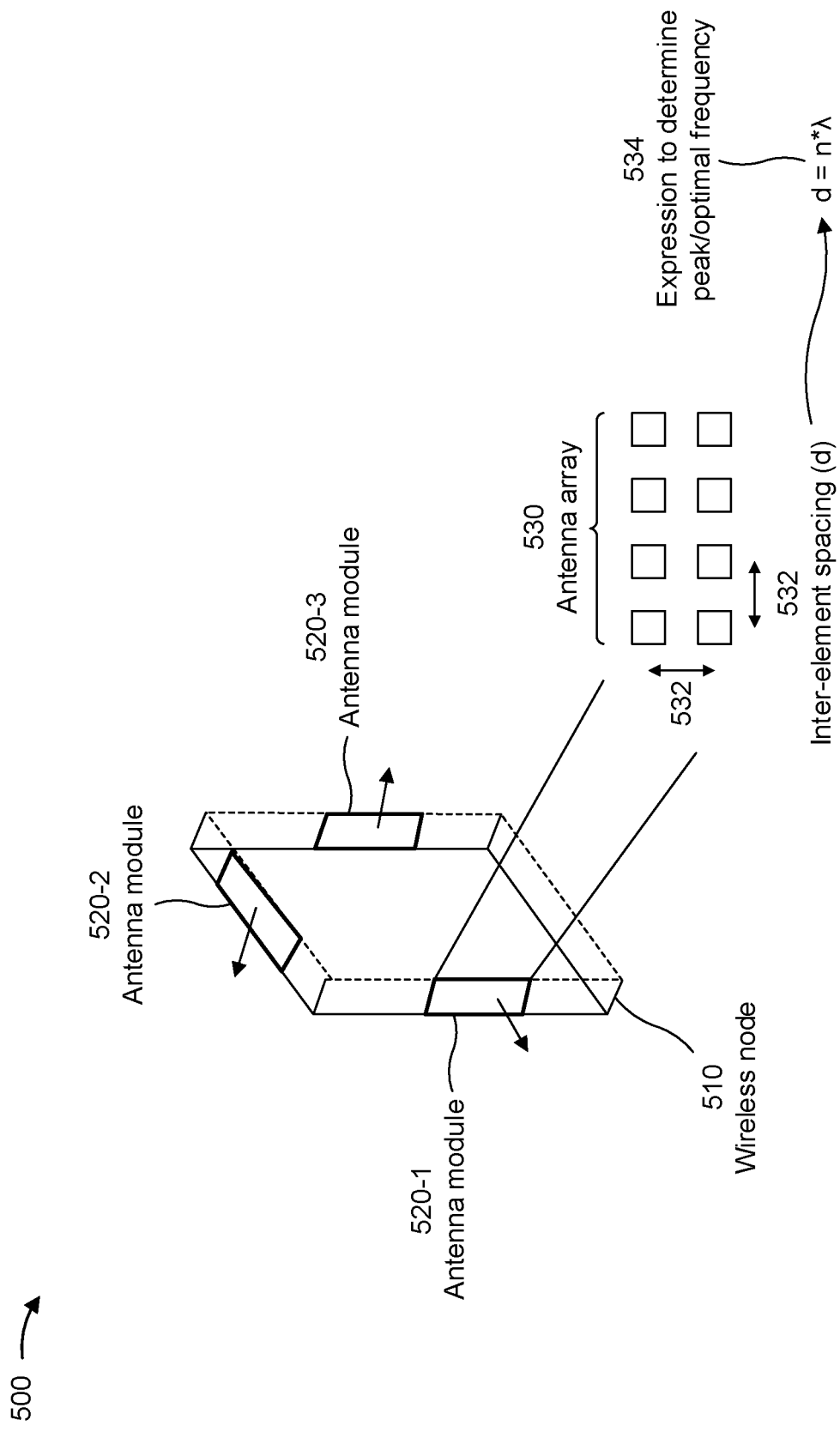
FIGS. 5A-5C are diagrams illustrating examples related to a wireless node having one or more antenna modules with one or more antenna arrays, in accordance with the present disclosure.
Figure 5B:
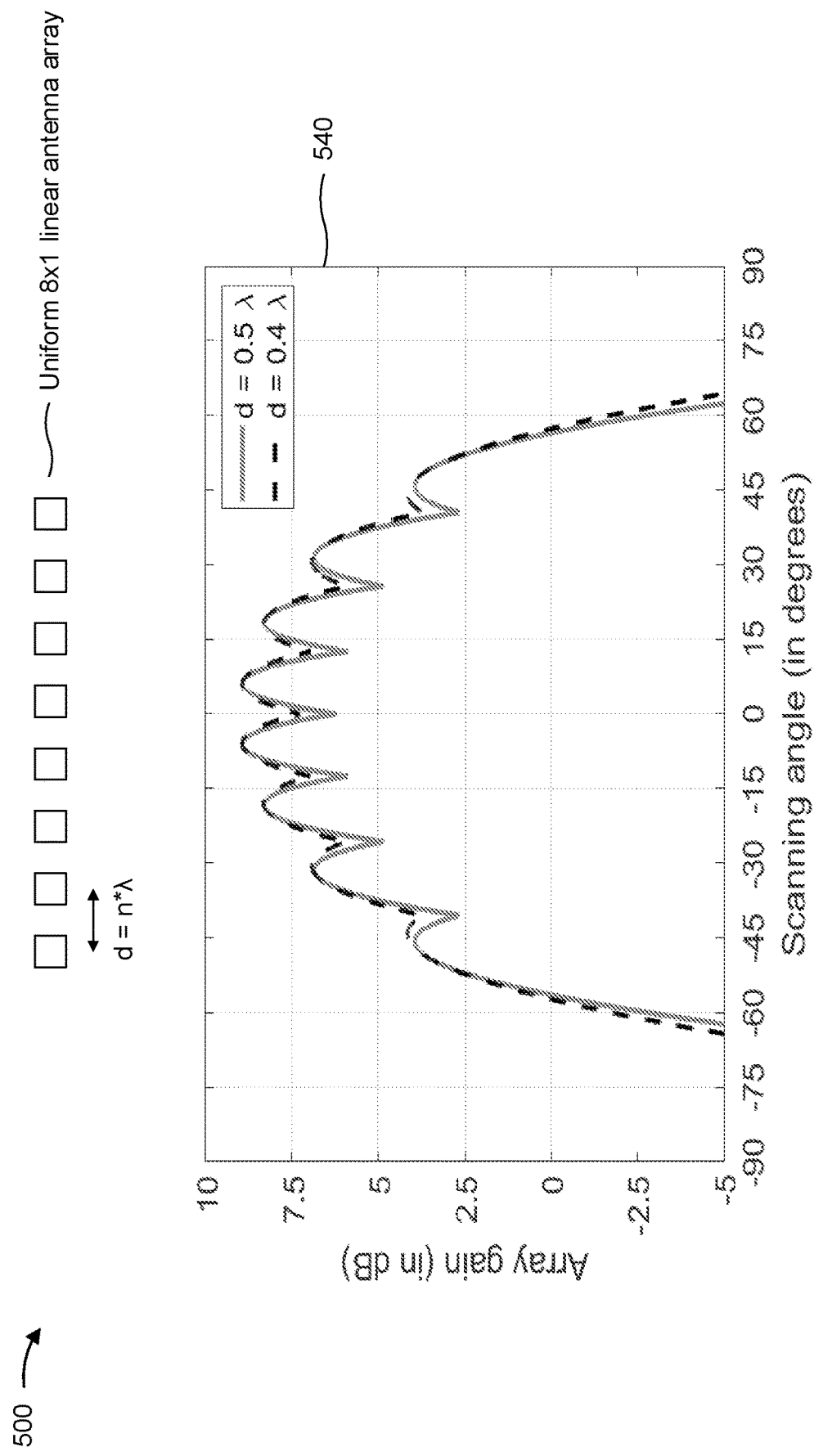
Figure 5C:
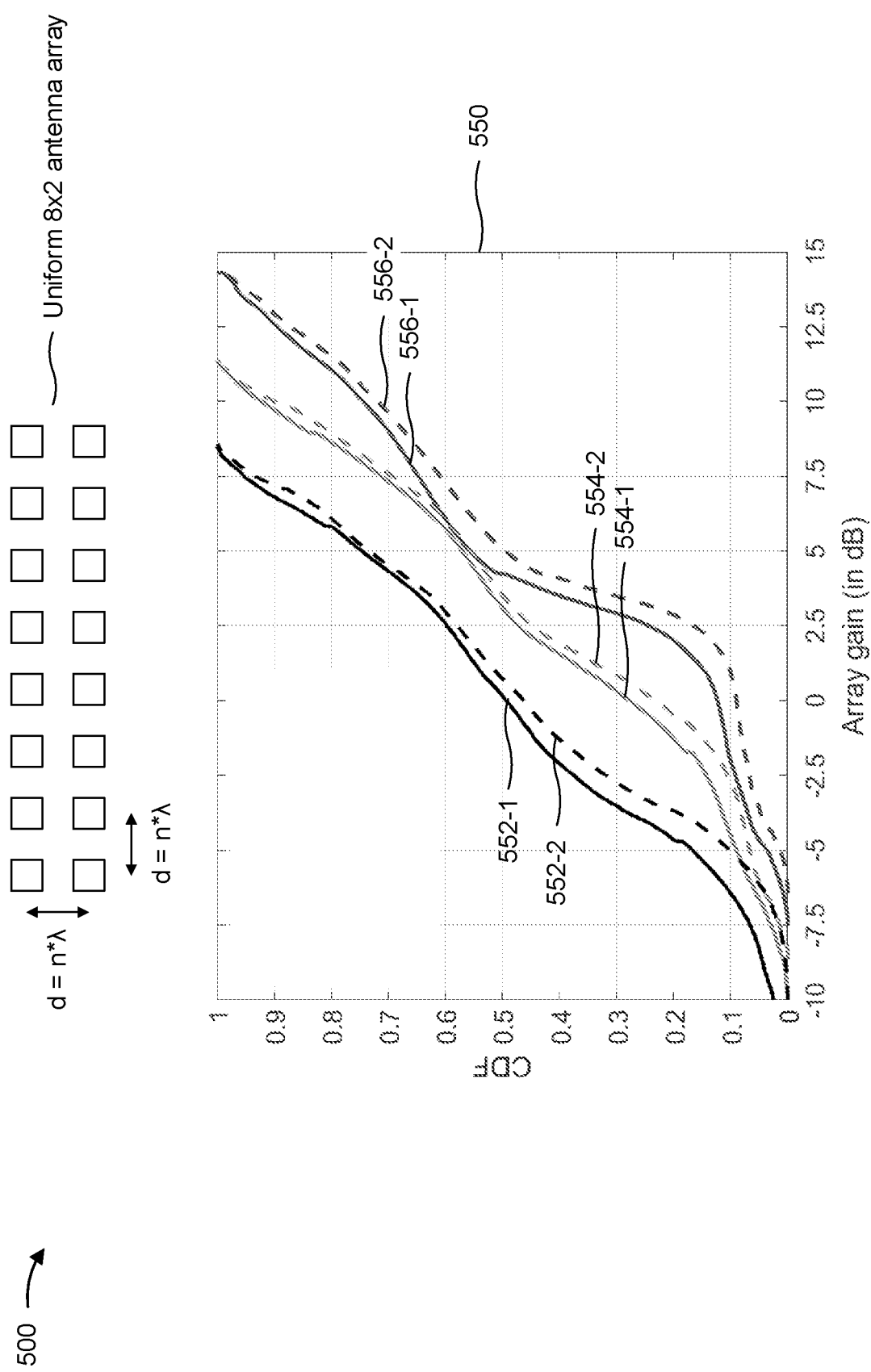

FIGS. 5A-5C are diagrams illustrating examples 500 related to a wireless node 510 that includes one or more antenna modules 520 with one or more antenna arrays 530, in accordance with the present disclosure. In some aspects, the wireless node 510 is shown in FIG. 5A as having a UE form factor. However, it will be appreciated that the form factor shown in FIG. 5A is an example only, and that wireless node 510 may be any suitable device that has wireless communication capabilities (e.g., a UE, a base station, a TRP, and/or an IAB node, among other examples).

As shown in FIG. 5A, the wireless node 510 includes one or more antenna modules 520, each of which may include one or more antenna arrays 530 that are designed to cover an operating bandwidth associated with a frequency range (e.g., from 24-48 GHz in FR2 and/or 57-71 GHz in FR4, among other examples). For example, in FIG. 5A, the wireless node 510 has three antenna modules (shown as antenna modules 520-1, 520-2, and 520-3) that each include one or more antenna arrays 530 to support wireless communication in an operating bandwidth. For example, the wireless node 510 may include different antenna modules 520 and related hardware (e.g., RF integrated circuits (RFICs)) to cover different frequency ranges (e.g., FR1 between 410 MHz and 7.125 GHz, FR2 between 24.25 GHz and 52.6 GHz, FR3 between 7.125 GHz and 24.25 GHz, FR4 between 52.6 GHz and 114.25 GHz, and/or FR5 including frequencies higher than 114.25 GHz, among other examples). Additionally, or alternatively, one or more antenna modules 520 may include an interleaved antenna array 530 in which some antenna elements cover a first bandwidth part and some antenna elements cover a second bandwidth part. For example, in an interleaved antenna array 530 that covers an operating bandwidth within FR2 (e.g., an operating bandwidth from 24-48 GHz), one or more antenna elements may cover a bandwidth part from 28-39 GHz and one or more antenna elements may cover a bandwidth part from 39-48 GHz.

In general, when an antenna array 530 is designed to cover an operating bandwidth (e.g., 24-48 GHz in FR2 and/or 57-71 GHz in FR2, among other examples), the antenna array 530 may be designed with a certain geometry that includes an inter-antenna element spacing (d) in one or more dimensions. For example, the antenna array 530 shown in FIG. 5A is a 4×2 array with an inter-antenna element spacing 532 that is fixed or uniform in an azimuth dimension and in an elevation dimension. As described above, the inter-antenna element spacing 532 may generally depend on an expected range of wavelengths or frequencies associated with an operating bandwidth or bandwidth part supported by the antenna array 530. For example, the inter-antenna element spacing 532 may provide a fraction of a wavelength ($n*\lambda$) of spacing between neighboring antenna elements to allow for interaction or constructive interference of signals transmitted by the separate antenna elements within the expected range of wavelengths or frequencies associated with the operating bandwidth or bandwidth part. As shown by reference number 534, a peak or optimal operating frequency may be determined according to the expression $d=n*\lambda$, where d is the inter-antenna element spacing 532, n is a constant, and $\lambda$ is a wavelength at the peak/optimal frequency (equivalent to c/f, where f is the peak/optimal frequency and c is the speed of light, or the speed at which an electromagnetic wave travels).

The inter-antenna element spacing 532 for a given antenna array 530 may be selected based on various factors, such as an effective or equivalent isotropic radiated power (EIRP) over a certain scan angle region, coverage over a certain frequency with constraints on array aperture, bill of materials (BOM) cost, feedline crossing reductions, and/or substrate properties that determine how many layers can be used in a printed circuit board manufacturing process, among other examples. In other words, the inter-antenna element spacing 532 may be tuned to offer optimal performance depending on an expected wavelength or frequency covered by the corresponding antenna array 530. As a result, the geometry of the antenna array 530 (e.g., the inter-antenna element spacing 532) can have a significant impact on performance. Furthermore, the value that is used for the constant, n, can impact performance and/or the peak or optimal frequency for a given inter-antenna element spacing 532. For example, antenna arrays 530 are often designed such that the inter-antenna element spacing 532 is 0.5 $\lambda$, as mutual coupling issues (e.g., electromagnetic interaction between the antenna elements in the antenna array 530) tend to arise when the inter-antenna element spacing 532 is less than 0.5 $\lambda$ and grating lobe issues tend to arise when the inter-antenna element spacing 532 is greater than 0.5 $\lambda$. However, there are many different parameters that may be impacted by the inter-antenna element spacing 532, whereby the value of the constant used to determine the optimal operating frequency may vary depending on the particular parameter to be optimized.

For example, because wavelength decreases as frequency increases, the wavelength may be significantly smaller at higher operating frequencies (e.g., in FR4 including frequencies from 52.6 GHz to 114.25 GHz and/or FR5 including frequencies higher than 114.25 GHz), which may be referred to as "upper millimeter wave bands" and/or a "sub-terahertz" (sub-THz) regime. Accordingly, because the wavelength in upper millimeter wave bands or the sub-THz regime is significantly smaller than the wavelength at FR2 (e.g., 28 GHz or 39 GHz), an antenna array 530 designed to cover frequencies in upper millimeter wave bands or the sub-THz regime may include more antenna elements within the same physical aperture. In such cases, a larger antenna array 530 may cover an ultrawide bandwidth (e.g., from 57-71 GHz), allowing significant performance and/or beamforming gains. In some cases, a wireless node 510 that includes an antenna array 530 designed to cover an ultrawide bandwidth may have a single RF chain that is used over the entire ultrawide bandwidth range.

Because a single RF chain uses one set of phase shifters, analog and/or RF beamforming may be constrained, performance may vary at different frequencies within the ultrawide bandwidth depending on one or more parameters to be optimized. Accordingly, when the wireless node 510 is communicating with another wireless node (not shown) over a wireless link, one approach to address the performance variations at different frequencies within the ultrawide bandwidth may be for the wireless node 510 to indicate a default operating frequency of the antenna array 530 to the other wireless node and vice versa. For example, the default operating frequency may generally correspond to a frequency that offers peak or optimal performance over an ultrawide bandwidth. In general, the default operating frequency may be based on the inter-antenna element spacing 532 for the antenna array 530, which indicates the frequency within the ultrawide bandwidth that offers peak array gain based on a given value for the constant used to determine the wavelength fraction. For example, given a 4×2 antenna array 530 with an inter-antenna element spacing 532 of 2.5 millimeters (mm) and a wavelength fraction of 0.5 $\lambda$ (n=0.5), the default operating frequency f is 60 GHz based on $d=0.5 \lambda=0.5$ c/f. Accordingly, the wireless node 510 and the other wireless node may communicate in a bandwidth part that includes the default operating frequency, or may assess how much loss is realized in the array gain and adapt physical layer parameters accordingly if the wireless node 510 and the other wireless node share a different bandwidth part (e.g., other than a bandwidth part that includes the default operating frequency).

However, merely exchanging the default operating frequency that offers peak or optimal performance for a given inter-antenna element spacing 532 may be problematic because the default operating frequency is dependent on the value of the constant n. For example, although a value of 0.5 $\lambda$ may offer a reasonable tradeoff between issues such as mutual coupling at values below 0.5 $\lambda$ and grating lobes at values higher than 0.5 $\lambda$, there may be scenarios where a uniform inter-antenna element spacing 532 having a value other than 0.5 $\lambda$ may offer better performance tradeoffs and/or scenarios where a non-uniform inter-antenna element spacing 532 offers better performance. For example, when the antenna array 530 is designed, the inter-antenna element spacing 532 may be chosen to optimize one or more communication parameters, such as controlling side lobes, controlling grating lobes, maximizing spherical coverage, reducing beam management latencies, and/or increasing a scan range, among other examples. Additionally, or alternatively, whether the inter-antenna element spacing 532 offers peak performance at a value of 0.5 $\lambda$ or some other fraction of a wavelength may depend on mutual coupling issues, which in turn may depend on a housing design and/or material properties, uncorrelatedness between antenna elements, power or thermal issues, an allowed size or aperture for the antenna array 530, and/or RFIC design constraints, among other examples.

For example, FIG. 5B illustrates an example plot 540 of an array gain (in decibels (dB)) as a function of scanning angle (in degrees) for a uniform 8×1 linear antenna array 530 that may have an inter-antenna element spacing 532 of 0.5

λ and/or an inter-antenna element spacing 532 of 0.4 λ. In this context, the inter-antenna element spacing 532 may generally have a fixed value (e.g., x millimeters), but the wavelength (and therefore the operating frequency) may vary depending on the value of n in the expression n*λ that is equivalent to the inter-antenna element spacing 532. For example, in FIG. 5B, plot 540 shows a solid line that indicates the array gain for 8 directional beams when the uniform 8×1 linear antenna array 530 is operated at a first frequency based on an inter-antenna element spacing 532 of 0.5 λ, and plot 540 further shows a dashed line that indicates the array gain for the 8 directional beams when the uniform 8×1 linear antenna array 530 is operated at a second frequency based on an inter-antenna element spacing 532 of 0.4 λ. In this case, as shown, the array gain is higher over the entire scanning range when the inter-antenna element spacing 532 is 0.4 λ, which may be attributable to the directional beams having a greater beamwidth as the inter-antenna element spacing 532 decreases. Accordingly, given a finite number of beams, selecting an operating frequency based on an inter-antenna element spacing 532 of 0.4 λ may offer better spherical coverage (subject to losses related to mutual coupling, which may be relatively small at 0.5 λ).

In another example, FIG. 5C illustrates an example plot 550 of a cumulative distribution function (CDF) of array gains for an 8×2 antenna array 530 with an inter-antenna element spacing 532 of 0.5 λ and an inter-antenna element spacing 532 of 0.4 λ. In the illustrated example, the solid line corresponding to curve 552-1 represents the array gain (in dB) for a size-4 beamforming codebook based on an inter-antenna element spacing 532 of 0.5 λ, and the dashed line corresponding to curve 552-2 represents the array gain for the size-4 beamforming codebook based on an inter-antenna element spacing 532 of 0.4 λ. Furthermore, the solid line corresponding to curve 554-1 represents the array gain for a size-8 beamforming codebook based on an inter-antenna element spacing 532 of 0.5 λ, and the dashed line corresponding to curve 554-2 represents the array gain for the size-8 beamforming codebook based on an inter-antenna element spacing 532 of 0.4 λ. As further shown, the solid line corresponding to curve 556-1 represents the array gain for a size-16 beamforming codebook based on an inter-antenna element spacing 532 of 0.5 λ, and the dashed line corresponding to curve 556-2 represents the array gain for the size-16 beamforming codebook based on an inter-antenna element spacing 532 of 0.4 λ. Accordingly, considering the three beamforming codebooks of size-4, size-8, and size-16, the spherical coverage (array gain performance over the sphere) is uniformly better at an inter-antenna element spacing 532 of 0.4 λ relative to an inter-antenna element spacing 532 of 0.5k.

Accordingly, because performance of an antenna array can vary significantly depending on whether an inter-antenna element spacing is equivalent to 0.5 λ or some other fraction of a wavelength, reporting the peak or optimal operating frequency may be problematic because the constant used to determine the peak or optimal operating frequency may vary depending on the structural parameter(s) and/or communication parameter(s) to be optimized. For example, as described above, the optimal inter-antenna element spacing (defined as n*λ) may depend on context, and different devices may have different possibilities for the optimal inter-antenna element spacing (e.g., the optimal value for n) depending on the parameter(s) to be optimized. In other words, because there is no value for n that is universally optimal for every antenna array and/or wireless communication scenario, indicating a peak or optimal operating frequency based on a fixed value for n prevents wireless nodes in communications with one another from choosing the best operating frequency based on respective array geometries. Accordingly, some aspects described herein relate to techniques and apparatuses that may exchange antenna array properties to assist beamforming on a wireless link. For example, the antenna array properties may vary from one device to another, and can significantly impact how network-level operations are to be optimized (e.g., based on structural parameters associated with the devices and/or communication parameters associated with the wireless link). In this way, the wireless devices may select the wavelength fraction that offers peak or optimal performance, which in turn may indicate the best operating frequency for the wireless link.

As indicated above, FIGS. 5A-5C are provided as examples. Other examples may differ from what is described with regard to FIGS. 5A-5C.

Figure 6:
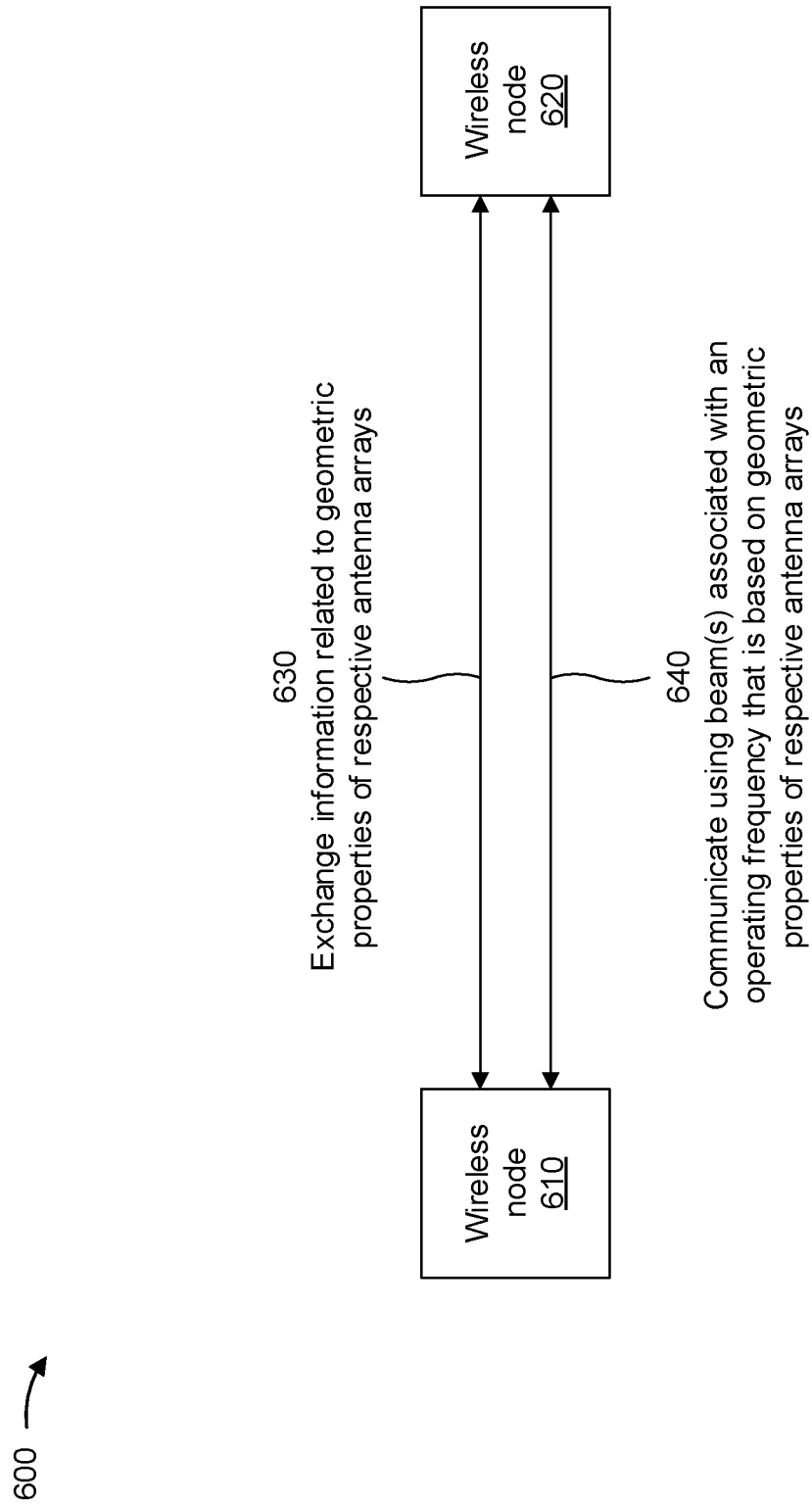
FIG. 6 is a diagram illustrating an example associated with exchanging antenna array properties to assist beamforming on a wireless link, in accordance with the present disclosure.

FIG. 6 is a diagram illustrating an example 600 associated with exchanging antenna array properties to assist beamforming on a wireless link, in accordance with the present disclosure. As shown in FIG. 6, example 600 includes communication between a first wireless node 610 and a second wireless node 620. In some aspects, the first wireless node 610 and the second wireless node 620 may communicate in a wireless network, such as wireless network 100. For example, in some aspects, the first wireless node 610 and the second wireless node 620 may correspond to a UE (e.g., UE 120) and a base station (e.g., base station 110) or TRP communicating over a wireless access link, different UEs (e.g., UEs 120a and 120e) communicating over a wireless sidelink, and/or an IAB node communicating with a child node or a parent node.

As shown in FIG. 6, and by reference number 630, the first wireless node 610 and the second wireless node 620 may exchange information related to geometric properties associated with respective antenna arrays. For example, the first wireless node 610 and the second wireless node 620 may each have one or more antenna arrays within one or more antenna modules, as described in further detail above. Accordingly, in some aspects, the first wireless node 610 may transmit, and the second wireless node 620 may receive, information related to geometric properties of one or more antenna arrays associated with the first wireless node 610. Furthermore, in some aspects, the second wireless node 620 may transmit, and the first wireless node 610 may receive, information related to geometric properties of one or more antenna arrays associated with the second wireless node 620. In general, the geometric properties of the antenna array(s) associated with each of the wireless nodes 610, 620 relates to fixed characteristics of internal hardware associated with the respective wireless nodes 610, 620. Accordingly, the exchange of the information related to the geometric properties of the respective antenna arrays may be a one-time exchange, which minimizes an overhead associated with the signaling to exchange the information related to the geometric properties of the respective antenna arrays.

In some aspects, the geometric properties of the respective arrays may include information related to inter-antenna element spacings of the respective antenna arrays. For example, each wireless node may convey information to indicate whether an antenna array of the wireless node has uniform inter-antenna element spacings or non-uniform inter-antenna element spacings in one or more dimensions. In this case, each wireless node may convey a one-bit (binary) field to indicate whether the antenna array of the wireless node has uniform inter-antenna element spacings or non-uniform inter-antenna element spacings. Additionally, or alternatively, each wireless node may convey a two-bit field to indicate whether a planar antenna array has uniform or non-uniform inter-antenna element spacings. For example, the two-bit field may include a first field to indicate whether the planar antenna array has uniform or non-uniform inter-antenna element spacings in an azimuth dimension and a second field to indicate whether the planar antenna array has uniform or non-uniform inter-antenna element spacings in an elevation dimension. Furthermore, in cases where one or more of the wireless nodes 610, 620 include multiple antenna arrays associated with one or more antenna modules, the geometric properties that are exchanged may be associated with some or all of the antenna arrays across some or all of the antenna modules.

In some aspects, in cases where one or more of the wireless nodes 610, 620 include an antenna array that has uniform inter-antenna element spacings in one or more dimensions, the exchanged geometric properties may include a common inter-antenna element spacing across the one or more dimensions. For example, for a linear antenna array with a uniform inter-antenna element spacing, the exchanged geometric properties may include an inter-antenna element spacing between adjacent antenna elements. In another example, for a planar antenna array with a uniform inter-antenna element spacing in the azimuth dimension and a uniform inter-antenna element spacing in the elevation dimension, the exchanged geometric properties may include a first inter-antenna element spacing between adjacent antenna elements in the azimuth dimension and a second inter-antenna element spacing between adjacent antenna elements in the elevation dimension. Additionally, or alternatively, where the inter-antenna element spacing is the same in the azimuth and elevation dimensions, the exchanged geometric properties may include a common inter-antenna element spacing across both the azimuth dimension and the elevation dimension.

Additionally, or alternatively, in cases where one or more of the wireless nodes 610, 620 include an antenna array that has non-uniform inter-antenna element spacings in one or more dimensions, the exchanged geometric properties may include the applicable inter-antenna element spacings across the one or more dimensions. For example, for a non-uniformly spaced antenna array, the exchanged geometric properties may include one or more of the inter-antenna element spacings between adjacent antenna elements in the azimuth dimension and one or more of the inter-antenna element spacings between adjacent antenna elements in the elevation dimension. For example, in some aspects, the exchanged geometric properties may include the largest inter-antenna element spacing in the non-uniformly spaced array, the smallest inter-antenna element spacing in the non-uniformly spaced array, the number of antenna elements in the azimuth dimension, and/or the number of antenna elements in the azimuth dimension, among other examples. Accordingly, as described herein, the first wireless node 610 and the second wireless node 620 may exchange coarse or granular information related to the respective antenna array geometries at either end of the wireless link, which may enable the wireless nodes 610, 620 to select the appropriate operating frequency for the wireless link.

For example, as shown by reference number 640, the first wireless node 610 and the second wireless node 620 may communicate using one or more beams associated with an operating frequency that is based at least in part on the geometric properties of the respective antenna arrays. For example, as described herein, the first wireless node 610 and the second wireless node 620 may communicate to negotiate, establish, or otherwise determine an appropriate value for a constant, n, that represents the optimal fraction of a wavelength for achieving peak or optimal performance for a given performance objective. For example, in some aspects, the performance objective may relate to a structural parameter associated with the first wireless node 610 and/or the second wireless node 620, such as a mutual coupling that may depend on housing and/or material properties, uncorrelatedness between antenna elements in the respective antenna arrays, power or thermal issues, an array aperture size, and/or RFIC design constraints, among other examples. Additionally, or alternatively, the performance objective may relate to a communication parameter associated with the one or more beams, such as array gain, spherical coverage, signal-to-noise ratio gain, side lobe or grating lobe (interference) levels, and/or beam management latency.

In this way, the wireless nodes 610, 620 may determine a value for $n*\lambda$ that offers the best performance, which in turn may indicate the peak or optimal operating frequency for a given inter-antenna element spacing (e.g., by solving for f in the expression $d=n*\lambda=n*c/f$). For example, one or more of the wireless nodes 610, 620 may determine a frequency at which a peak array gain is expected based on a simple fast Fourier transform (FFT) computation or translation. In another example, based on the geometric properties of the antenna arrays at a certain bandwidth part, one or more of the wireless nodes 610, 620 may determine whether a beamforming codebook stored in RFIC memory is sufficient or whether a different optimized codebook needs to be loaded. In this case, if the beamforming codebook stored in RFIC memory is insufficient and the latency to load the different optimized codebook is large (e.g., resulting in a long beam management latency), then the wireless nodes 610, 620 may refrain from communicating using the bandwidth part that requires loading the different optimized codebook. In other examples, the geometries of the antenna arrays may be relevant to latencies that involve coexistence with devices communicating in unlicensed or shared spectrum (e.g., where a time scale to switch from one channelization to another may be large). Accordingly, by exchanging coarse or granular details related to respective antenna array geometries, the feedback between the wireless nodes 610, 620 may enable the respective antenna array geometries to be considered in order to optimize performance in millimeter wave communications and beyond.

As indicated above, FIG. 6 is provided as an example. Other examples may differ from what is described with regard to FIG. 6.

Figure 7:
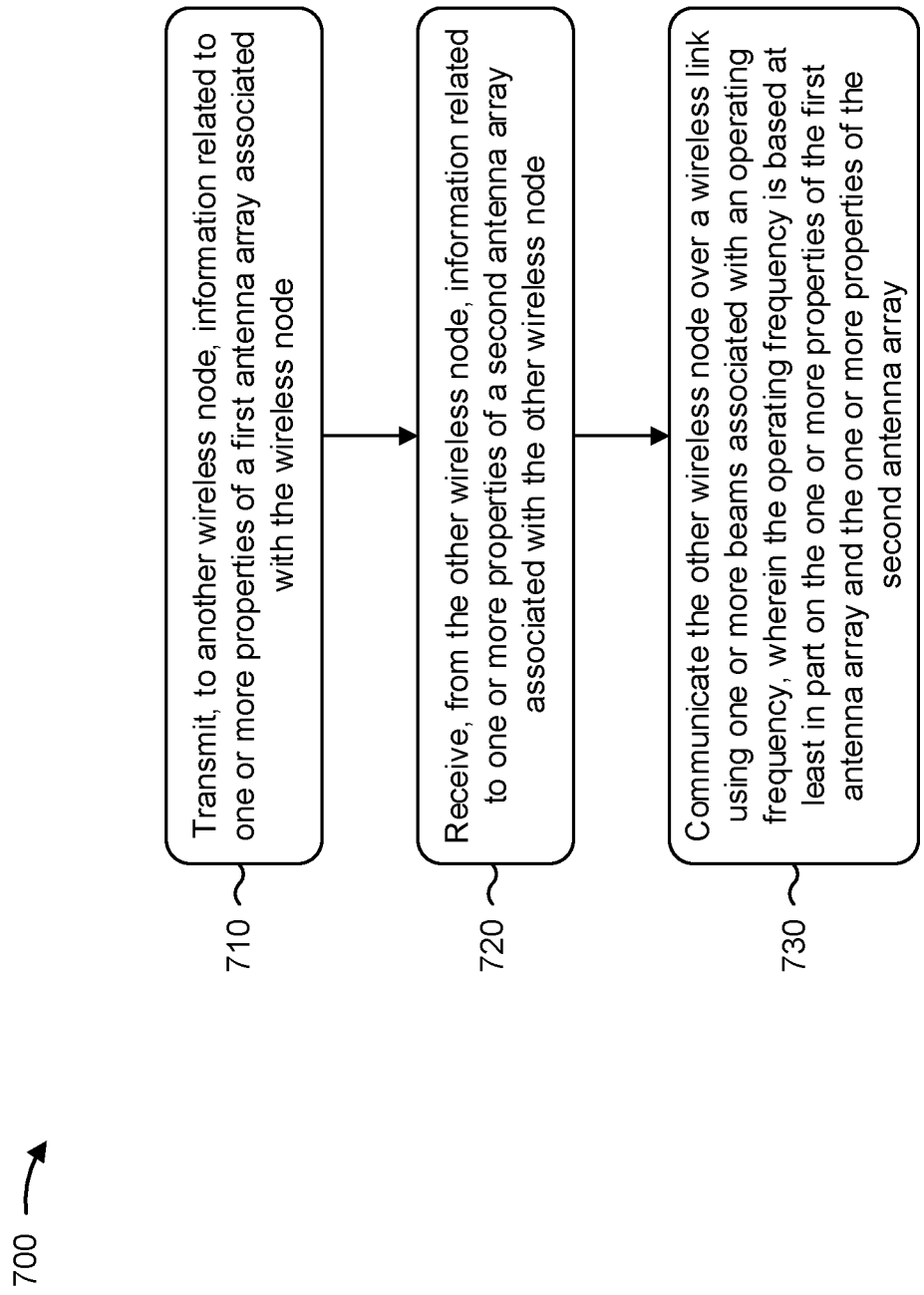
FIG. 7 is a diagram illustrating an example process associated with exchanging antenna array properties to assist beamforming on a wireless link, in accordance with the present disclosure.

FIG. 7 is a diagram illustrating an example process 700 performed, for example, by a wireless node, in accordance with the present disclosure. Example process 700 is an example where the wireless node (e.g., base station 110, UE 120, wireless node 510, wireless node 610, and/or wireless node 620) performs operations associated with exchanging antenna array properties to assist beamforming on a wireless link.

As shown in FIG. 7, in some aspects, process 700 may include transmitting, to another wireless node, information related to one or more properties of a first antenna array associated with the wireless node (block 710). For example, the wireless node (e.g., using transmission component 804, depicted in FIG. 8) may transmit, to another wireless node, information related to one or more properties of a first antenna array associated with the wireless node, as described above.

As further shown in FIG. 7, in some aspects, process 700 may include receiving, from the other wireless node, information related to one or more properties of a second antenna array associated with the other wireless node (block 720). For example, the wireless node (e.g., using reception component 802, depicted in FIG. 8) may receive, from the other wireless node, information related to one or more properties of a second antenna array associated with the other wireless node, as described above.

As further shown in FIG. 7, in some aspects, process 700 may include communicating with the other wireless node over a wireless link using one or more beams associated with an operating frequency, wherein the operating frequency is based at least in part on the one or more properties of the first antenna array and the one or more properties of the second antenna array (block 730). For example, the wireless node (e.g., using communication component 808, depicted in FIG. 8) may communicate with the other wireless node over a wireless link using one or more beams associated with an operating frequency, wherein the operating frequency is based at least in part on the one or more properties of the first antenna array and the one or more properties of the second antenna array, as described above.

Process 700 may include additional aspects, such as any single aspect or any combination of aspects described below and/or in connection with one or more other processes described elsewhere herein.

In a first aspect, the one or more properties of the first antenna array and the one or more properties of the second antenna array relate to inter-antenna element spacings in one or more dimensions.

In a second aspect, alone or in combination with the first aspect, one or more of the information transmitted to the other wireless node or the information received from the other wireless node includes a one-bit field to indicate whether a corresponding antenna array has uniform or non-uniform inter-antenna element spacings in one or more dimensions.

In a third aspect, alone or in combination with one or more of the first and second aspects, one or more of the information transmitted to the other wireless node or the information received from the other wireless node includes a two-bit field having first bit to indicate whether a corresponding antenna array has uniform or non-uniform inter-antenna element spacings in a first dimension and a second bit to indicate whether the corresponding antenna array has uniform or non-uniform inter-antenna element spacings in a second dimension.

In a fourth aspect, alone or in combination with one or more of the first through third aspects, the information transmitted to the other wireless node and the information received from the other wireless node indicates the one or more properties for one or more antenna arrays across one or more antenna modules.

In a fifth aspect, alone or in combination with one or more of the first through fourth aspects, one or more of the information transmitted to the other wireless node or the information received from the other wireless node includes a common inter-antenna element spacing across one or more dimensions for a corresponding antenna array.

In a sixth aspect, alone or in combination with one or more of the first through fifth aspects, one or more of the information transmitted to the other wireless node or the information received from the other wireless node includes an inter-antenna element spacing across a first dimension or an inter-antenna element spacing across a second dimension for a corresponding antenna array.

In a seventh aspect, alone or in combination with one or more of the first through sixth aspects, one or more of the information transmitted to the other wireless node or the information received from the other wireless node includes a largest or a smallest inter-antenna element spacing across one or more dimensions for a corresponding antenna array.

In an eighth aspect, alone or in combination with one or more of the first through seventh aspects, one or more of the information transmitted to the other wireless node or the information received from the other wireless node includes a number of antenna elements across one or more dimensions for a corresponding antenna array.

In a ninth aspect, alone or in combination with one or more of the first through eighth aspects, the operating frequency is further based at least in part on a constant having a value that is based at least in part on one or more structural parameters associated with the wireless node or the other wireless node.

In a tenth aspect, alone or in combination with one or more of the first through ninth aspects, the operating frequency is further based at least in part on a constant having a value that is based at least in part on one or more communication parameters to be optimized for the one or more beams.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
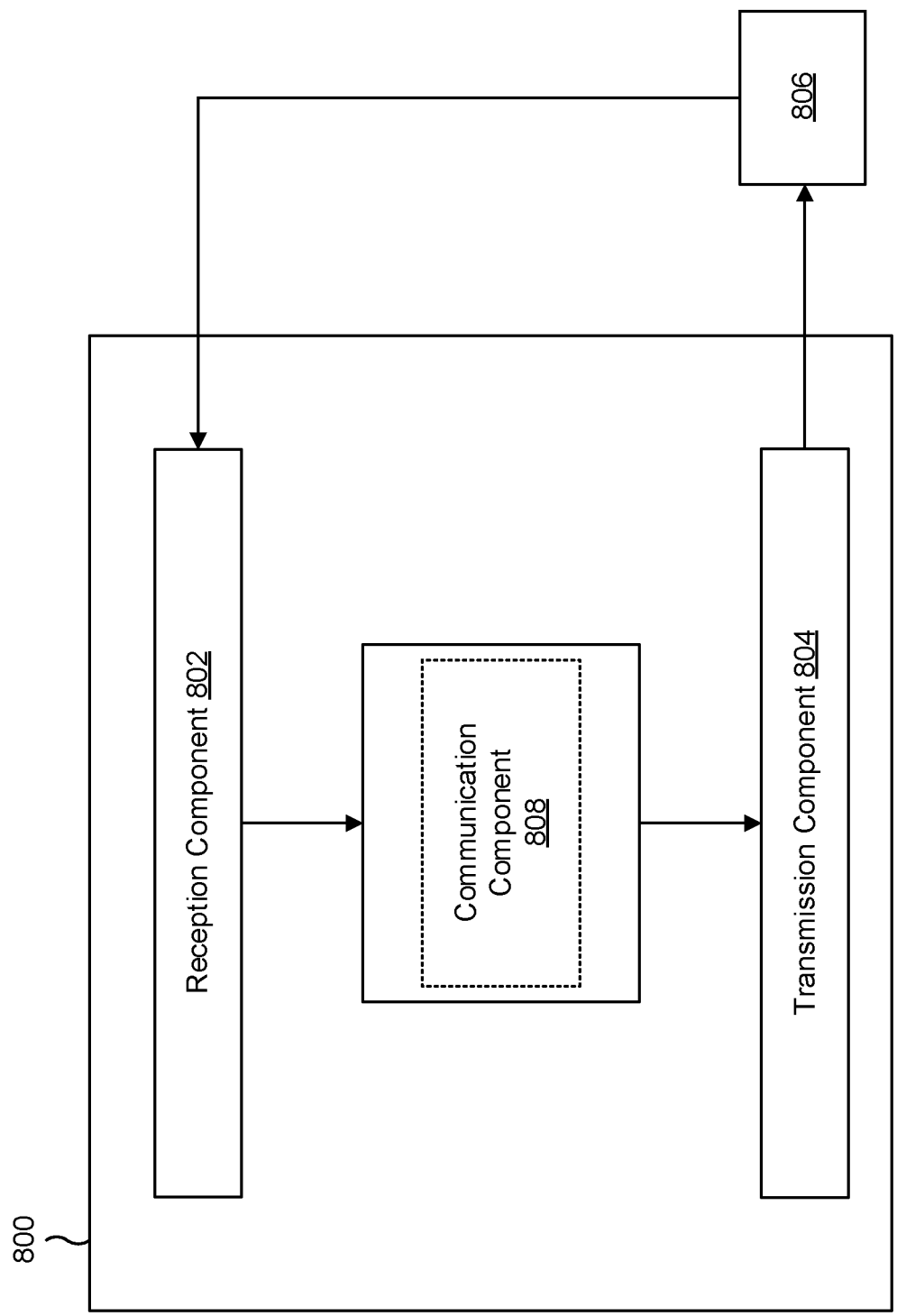
FIG. 8 is a block diagram of an example apparatus for wireless communication, in accordance with the present disclosure.

FIG. 8 is a block diagram of an example apparatus 800 for wireless communication. The apparatus 800 may be a wireless node, or a wireless node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication component 808, among other examples.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the base station 110 and/or the UE 120 described above in connection with FIG. 2, the Tx chain 302 and/or the Rx chain 304 described above in connection with FIG. 3, the beamforming architecture 400 described above in connection with FIG. 4, and/or the wireless node 510 described above in connection with FIGS. 5A-5C, among other examples. Additionally, or alternatively, one or more components shown in FIG. 8 may be implemented within one or more components described above in connection with FIG. 2, FIG. 3, FIG. 4, and/or FIGS. 5A-5C. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, an Rx chain, an amplifier, a phase shifter, a combiner, a mixer, a local oscillator, an analog-to-digital converter, a controller/processor, a memory, or a combination thereof, as described above in connection with FIG. 2, FIG. 3, FIG. 4, and/or FIGS. 5A-5C.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a Tx chain, a digital-to-analog converter, a local oscillator, a mixer, a splitter, an amplifier, a phase shifter, a controller/processor, a memory, or a combination thereof, as described above in connection with FIG. 2, FIG. 3, FIG. 4, and/or FIGS. 5A-5C. In some aspects, the transmission component 804 may be co-located with the reception component 802 in a transceiver.

The transmission component 804 may transmit, to another wireless node, information related to one or more properties of a first antenna array associated with the wireless node. The reception component 802 may receive, from the other wireless node, information related to one or more properties of a second antenna array associated with the other wireless node. The communication component 808 may communicate with the other wireless node over a wireless link using one or more beams associated with an operating frequency that is based at least in part on the one or more properties of the first antenna array and the one or more properties of the second antenna array.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a wireless node, comprising: transmitting, to another wireless node, information related to one or more properties of a first antenna array associated with the wireless node; receiving, from the other wireless node, information related to one or more properties of a second antenna array associated with the other wireless node; and communicating with the other wireless node over a wireless link using one or more beams associated with an operating frequency, wherein the operating frequency is based at least in part on the one or more properties of the first antenna array and the one or more properties of the second antenna array.

Aspect 2: The method of Aspect 1, wherein the one or more properties of the first antenna array and the one or more properties of the second antenna array relate to inter-antenna element spacings in one or more dimensions.

Aspect 3: The method of any of Aspects 1-2, wherein one or more of the information transmitted to the other wireless node or the information received from the other wireless node includes a one-bit field to indicate whether a corresponding antenna array has uniform or non-uniform inter-antenna element spacings in one or more dimensions.

Aspect 4: The method of any of Aspects 1-3, wherein one or more of the information transmitted to the other wireless node or the information received from the other wireless node includes a two-bit field having first bit to indicate whether a corresponding antenna array has uniform or non-uniform inter-antenna element spacings in a first dimension and a second bit to indicate whether the corresponding antenna array has uniform or non-uniform inter-antenna element spacings in a second dimension.

Aspect 5: The method of any of Aspects 1-4, wherein the information transmitted to the other wireless node and the information received from the other wireless node indicates the one or more properties for one or more antenna arrays across one or more antenna modules.

Aspect 6: The method of any of Aspects 1-5, wherein one or more of the information transmitted to the other wireless node or the information received from the other wireless node includes a common inter-antenna element spacing across one or more dimensions for a corresponding antenna array.

Aspect 7: The method of any of Aspects 1-6, wherein one or more of the information transmitted to the other wireless node or the information received from the other wireless node includes an inter-antenna element spacing across a first dimension or an inter-antenna element spacing across a second dimension for a corresponding antenna array.

Aspect 8: The method of any of Aspects 1-7, wherein one or more of the information transmitted to the other wireless node or the information received from the other wireless node includes a largest or a smallest inter-antenna element spacing across one or more dimensions for a corresponding antenna array.

Aspect 9: The method of any of Aspects 1-8, wherein one or more of the information transmitted to the other wireless node or the information received from the other wireless node includes a number of antenna elements across one or more dimensions for a corresponding antenna array.

Aspect 10: The method of any of Aspects 1-9, wherein the operating frequency is further based at least in part on a constant having a value that is based at least in part on one or more structural parameters associated with the wireless node or the other wireless node.

Aspect 11: The method of any of Aspects 1-10, wherein the operating frequency is further based at least in part on a constant having a value that is based at least in part on one or more communication parameters to be optimized for the one or more beams.

Aspect 12: An apparatus for wireless communication at a device, comprising a processor; memory coupled with the processor; and instructions stored in the memory and executable by the processor to cause the apparatus to perform the method of any of Aspects 1-11.

Aspect 13: A device for wireless communication, comprising a memory and one or more processors coupled to the memory, the memory and the one or more processors configured to perform the method of any of Aspects 1-11.

Aspect 14: An apparatus for wireless communication, comprising at least one means for performing the method of any of Aspects 1-11.

Aspect 15: A non-transitory computer-readable medium storing code for wireless communication, the code comprising instructions executable by a processor to perform the method of any of Aspects 1-11.

Aspect 16: A non-transitory computer-readable medium storing a set of instructions for wireless communication, the set of instructions comprising one or more instructions that, when executed by one or more processors of a device, cause the device to perform the method of any of Aspects 1-11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless node, comprising:
   transmitting, to another wireless node, information related to one or more properties of a first antenna array associated with the wireless node;
   receiving, from the other wireless node, information related to one or more properties of a second antenna array associated with the other wireless node; and
   communicating with the other wireless node over a wireless link using one or more beams associated with an operating frequency, wherein the operating frequency is based at least in part on the one or more properties of the first antenna array, the one or more properties of the second antenna array, and a value determined based at least in part on one or more structural parameters, wherein the one or more structural parameters include at least one of: uncorrelatedness between antenna elements in the respective antenna arrays, power issues, thermal issues, or radio frequency integrated circuit design constraints.

2. The method of claim 1, wherein the one or more properties of the first antenna array and the one or more properties of the second antenna array relate to inter-antenna element spacings in one or more dimensions.

3. The method of claim 1, wherein one or more of the information transmitted to the other wireless node or the information received from the other wireless node includes a one-bit field to indicate whether a corresponding antenna array has uniform or non-uniform inter-antenna element spacings in one or more dimensions.

4. The method of claim 1, wherein one or more of the information transmitted to the other wireless node or the information received from the other wireless node includes a two-bit field having first bit to indicate whether a corresponding antenna array has uniform or non-uniform inter-antenna element spacings in a first dimension and a second bit to indicate whether the corresponding antenna array has uniform or non-uniform inter-antenna element spacings in a second dimension.

5. The method of claim 1, wherein the information transmitted to the other wireless node and the information received from the other wireless node indicates the one or more properties for one or more antenna arrays across one or more antenna modules.

6. The method of claim 1, wherein one or more of the information transmitted to the other wireless node or the information received from the other wireless node includes a common inter-antenna element spacing across one or more dimensions for a corresponding antenna array.

7. The method of claim 1, wherein one or more of the information transmitted to the other wireless node or the information received from the other wireless node includes an inter-antenna element spacing across a first dimension or an inter-antenna element spacing across a second dimension for a corresponding antenna array.

8. The method of claim 1, wherein one or more of the information transmitted to the other wireless node or the information received from the other wireless node includes a largest or a smallest inter-antenna element spacing across one or more dimensions for a corresponding antenna array.

9. The method of claim 1, wherein one or more of the information transmitted to the other wireless node or the information received from the other wireless node includes a number of antenna elements across one or more dimensions for a corresponding antenna array.

10. The method of claim 1, wherein the value is based at least in part on an aperture associated with the wireless node or the other wireless node.

11. The method of claim 1, wherein the value is based at least in part on one or more communication parameters, the one or more communication parameters comprising at least one parameter to be optimized for the one or more beams.

12. A wireless node for wireless communication, comprising:
  a memory; and
  one or more processors, coupled to the memory, configured to:
    transmit, to another wireless node, information related to one or more properties of a first antenna array associated with the wireless node;
    receive, from the other wireless node, information related to one or more properties of a second antenna array associated with the other wireless node; and
    communicate with the other wireless node over a wireless link using one or more beams associated with an operating frequency, wherein the operating frequency is based at least in part on the one or more properties of the first antenna array, the one or more properties of the second antenna array, and a value determined based at least in part on one or more structural parameters, wherein the one or more structural parameters include at least one of: uncorrelatedness between antenna elements in the respective antenna arrays, power issues, thermal issues, or radio frequency integrated circuit design constraints.

13. The wireless node of claim 12, wherein the one or more properties of the first antenna array and the one or more properties of the second antenna array relate to inter-antenna element spacings in one or more dimensions.

14. The wireless node of claim 12, wherein one or more of the information transmitted to the other wireless node or the information received from the other wireless node includes a one-bit field to indicate whether a corresponding antenna array has uniform or non-uniform inter-antenna element spacings in one or more dimensions.

15. The wireless node of claim 12, wherein one or more of the information transmitted to the other wireless node or the information received from the other wireless node includes a two-bit field having first bit to indicate whether a corresponding antenna array has uniform or non-uniform inter-antenna element spacings in a first dimension and a second bit to indicate whether the corresponding antenna array has uniform or non-uniform inter-antenna element spacings in a second dimension.

16. The wireless node of claim 12, wherein the information transmitted to the other wireless node and the information received from the other wireless node indicates the one or more properties for one or more antenna arrays across one or more antenna modules.

17. The wireless node of claim 12, wherein one or more of the information transmitted to the other wireless node or the information received from the other wireless node includes a common inter-antenna element spacing across one or more dimensions for a corresponding antenna array.

18. The wireless node of claim 12, wherein one or more of the information transmitted to the other wireless node or the information received from the other wireless node includes an inter-antenna element spacing across a first dimension or an inter-antenna element spacing across a second dimension for a corresponding antenna array.

19. The wireless node of claim 12, wherein one or more of the information transmitted to the other wireless node or the information received from the other wireless node includes a largest or a smallest inter-antenna element spacing across one or more dimensions for a corresponding antenna array.

20. The wireless node of claim 12, wherein one or more of the information transmitted to the other wireless node or the information received from the other wireless node includes a number of antenna elements across one or more dimensions for a corresponding antenna array.

21. The wireless node of claim 12, wherein the value is based at least in part on an aperture associated with the wireless node or the other wireless node.

22. The wireless node of claim 12, wherein the value is based at least in part on one or more communication parameters, the one or more communication parameters comprising at least one parameter to be optimized for the one or more beams.

23. An apparatus for wireless communication, comprising:
  means for transmitting, to another wireless node, information related to one or more properties of a first antenna array associated with the wireless node;
  means for receiving, from the other wireless node, information related to one or more properties of a second antenna array associated with the other wireless node; and
  means for communicating with the other wireless node over a wireless link using one or more beams associated with an operating frequency, wherein the operating frequency is based at least in part on the one or more properties of the first antenna array, the one or more properties of the second antenna array, and a value determined based at least in part on one or more structural parameters, wherein the one or more structural parameters include at least one of: uncorrelatedness between antenna elements in the respective antenna arrays, power issues, thermal issues, or radio frequency integrated circuit design constraints.

24. The apparatus of claim 23, wherein the one or more properties of the first antenna array and the one or more properties of the second antenna array relate to inter-antenna element spacings in one or more dimensions.

25. The apparatus of claim 23, wherein the value is based at least in part on an aperture associated with the wireless node or the other wireless node.

26. The apparatus of claim 23, wherein the value is based at least in part on one or more communication parameters, the one or more communication parameters comprising at least one parameter to be optimized for the one or more beams.

27. A non-transitory computer-readable medium storing a set of instructions for wireless communication, the set of instructions comprising:
one or more instructions that, when executed by one or more processors of a wireless node, cause the wireless node to:
transmit, to another wireless node, information related to one or more properties of a first antenna array associated with the wireless node;
receive, from the other wireless node, information related to one or more properties of a second antenna array associated with the other wireless node; and
communicate with the other wireless node over a wireless link using one or more beams associated with an operating frequency, wherein the operating frequency is based at least in part on the one or more properties of the first antenna array, the one or more properties of the second antenna array, and a value determined based at least in part on one or more structural parameters, wherein the one or more structural parameters include at least one of: uncorrelatedness between antenna elements in the respective antenna arrays, power issues, thermal issues, or radio frequency integrated circuit design constraints.

28. The non-transitory computer-readable medium of claim 27, wherein the one or more properties of the first antenna array and the one or more properties of the second antenna array relate to inter-antenna element spacings in one or more dimensions.

29. The non-transitory computer-readable medium of claim 27, wherein the value is based at least in part on an aperture associated with the wireless node or the other wireless node.

30. The non-transitory computer-readable medium of claim 27, wherein the value is based at least in part on one or more communication parameters, the one or more communication parameters comprising at least one parameter to be optimized for the one or more beams.

* * * * *